United States Patent [19]

Nagamine

[11] Patent Number: 5,074,651
[45] Date of Patent: Dec. 24, 1991

[54] OPERATION MICROSCOPE INCLUDING EYEPIECE TUBE ROTARY ANGLE DRIVE MEANS AND ANGLE DETECTING MEANS

[75] Inventor: Kouichi Nagamine, Tokyo, Japan

[73] Assignee: Kabushiki Kaisha Topcon, Tokyo, Japan

[21] Appl. No.: 569,037

[22] Filed: Aug. 17, 1990

[30] Foreign Application Priority Data

Aug. 23, 1989 [JP] Japan .................................. 1-217069

[51] Int. Cl.⁵ .................. G02B 21/00; G02B 21/20
[52] U.S. Cl. .................................. 359/384; 359/368
[58] Field of Search .................................. 350/522, 507

[56] References Cited

U.S. PATENT DOCUMENTS

| | | | |
|---|---|---|---|
| 3,809,454 | 5/1974 | Brambring | 350/522 |
| 4,576,450 | 3/1986 | Westphal | 350/522 |
| 4,798,451 | 1/1989 | Fujiwara | 350/522 |
| 4,867,405 | 9/1989 | Nakamura | 350/522 |
| 4,881,709 | 11/1989 | Nakamura | 350/522 |

Primary Examiner—Jon W. Henry
Attorney, Agent, or Firm—Armstrong, Nikaido, Marmelstein, Kubovcik & Murray

[57] ABSTRACT

An operation microscope includes a tube attached to its support so as to be turned up or down with respect to an operation objective. An eyepiece tube is attached to the tube so as to change its position in a direction with respect to this adjustment. A turning up and down angle detection device detects an angle for the tube. An eyepiece tube drive device changes the rotary angle of the eyepiece tube. A control device uses detection results of the turning up and down angle detection device and, based on the detection results, the eyepiece tube drive device is controlled to return the eyepiece tube to its original position. By this construction, when the tube is in the turning up or down state at a given angle with respect to an operation objective, the angle detection device detects the tube's turning up or down angle and thereby outputs the detection results. The control device then, based on the detection results from the angle detection device, controls the eyepiece drive device to return the eyepiece tube to its original position according to the adjusting angle. Therefore, an operator is always able to make the observation at the optimal position.

4 Claims, 5 Drawing Sheets

OPERATION MICROSCOPE INCLUDING EYEPIECE TUBE ROTARY ANGLE DRIVE MEANS AND ANGLE DETECTING MEANS

BACKGROUND OF THE INVENTION

1. Field of the Invention

The present invention relates to an operation microscope, of the type used in an surgical operation.

2. Description of the Prior Art

This type of operation microscope consists of a tube with an objective lens attached to its end and an eyepiece tube attached to the this tube, each tube being rotatable. In such an operation microscope, to make the observational angle optimal with respect to an observation objective, the tube is frequently turned up and down in the course of operation, depending on the operational situation.

As a result of this constant turning up and down of the tube, the eyepiece tube obviously changes its position. Therefore, when the angle of turning up or down the tube is large, it becomes necessary to return the eyepiece tube to its original position, by hand i.e., angle so that the observation by an operator is easy. This problem can result in the suspension of the operation.

Moreover, there is a problem in that due to the angle adjustment for the eyepiece tube, the operator's hands, which must be maintained in a clean state become contaminated by touching the eyepiece tube.

OBJECTS AND SUMMARY OF THE INVENTION

The present invention has been designed to cope with the above-described situation. Its object is therefore to provide an operation microscope wherein there is no problem of causing suspension of the operation or contaminating the hands due to the adjusting of the tube.

In an operation microscope including a tube attached to its support so as to turn up or down with respect to the operation objective and an eyepiece tube attached to the tube so as to change its position in a direction with respect to this vertical adjustment, the invention consists as a turning up and down angle detection device for the tube, an eyepiece tube drive as a means for changing the rotary angle of the eyepiece tube and a control device which detects results of the turning up and down angle detection device which are input and on the basis of these detection results the eyepiece tube drive device is controlled so as to return the eyepiece tube to its original position.

By this construction, when the tube is turned up or down at a given angle with respect to an operation objective, the angle detection device detects this change and thereby sends out the detection results. The control device then, on the basis of the detection results from the angle detection device, controls the eyepiece drive device so as to return the eyepiece tube to its original position according to the adjusted angle. Therefore, an operator is always able to make the observation at an optimal position.

If then the eyepiece tube drive device is made up of a motor and a power transmission mechanism, the drive can be made smoothly.

If the turning up and down angle detection device is a potentiometer, the turning up and down angle can be detected accurately.

Furthermore, if the change of the turning up and down angle is made electrically, the handling can be even more convenient.

DESCRIPTION OF THE PREFERRED EMBODIMENTS

An embodiment of the present invention will be explained in detail at this point.

Figure 1:
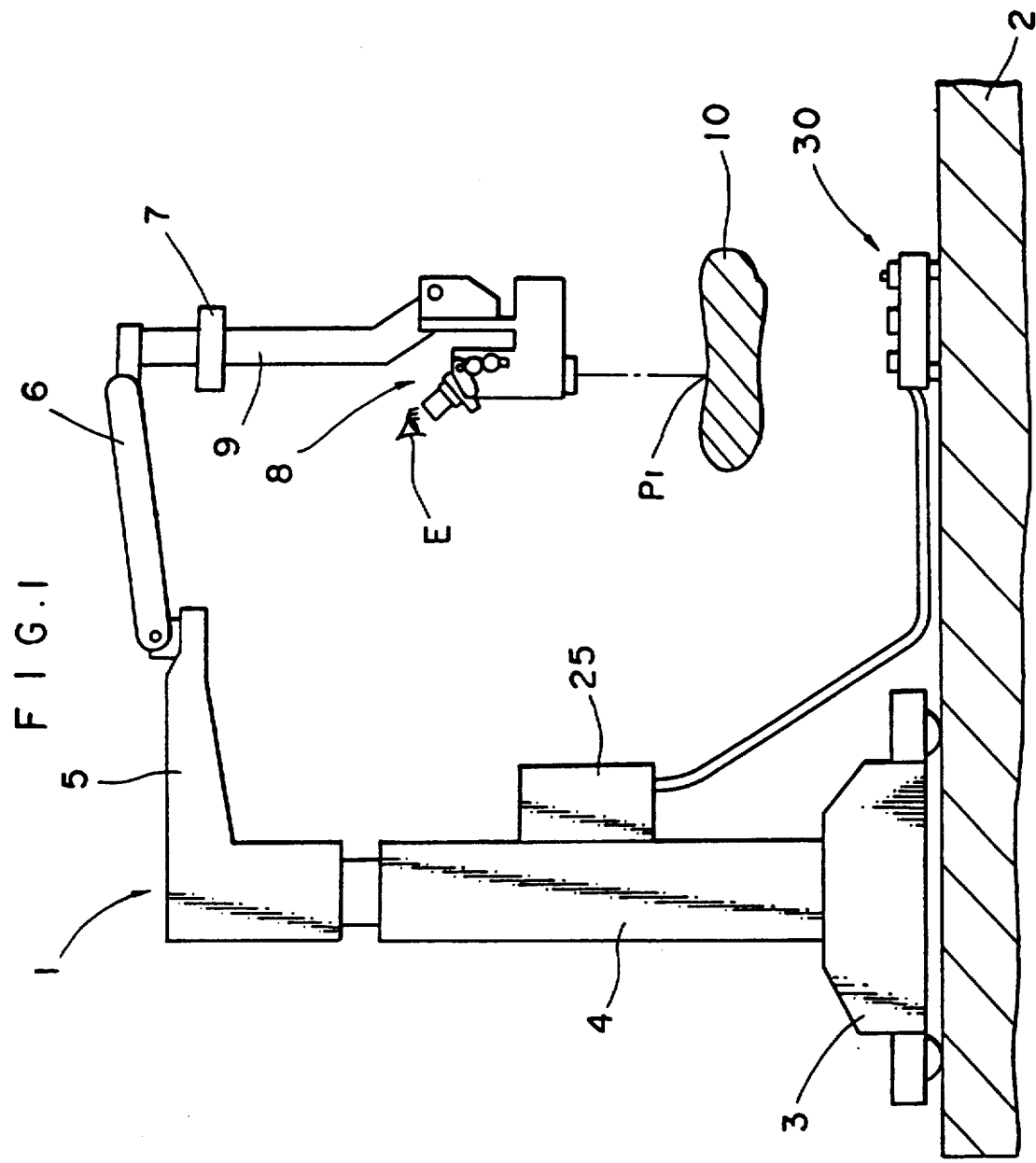
FIG. 1 is a side elevation illustrating an operation microscope as an embodiment of the invention.

An operation microscope 1 illustrated in FIG. 1 comprises a support base 3 capable of moving on the floor 2, a first arm 5 supported by a support column 4 attached to the support base 3, a second arm 6 attached to the first arm 5, an X-Y drive section 7 attached to the second arm 6 and a microscope proper 8 attached to a tube support member 9, at its lower end, supported with the X-Y drive section 7.

The operation microscope 1 also includes a foot switch 30 as an operation means to handle the respective electrical systems of the operation microscope, i.e., the X-Y drive section 7 and a zoom system as well as an illumination system, not shown, for the microscope proper 8.

The microscope proper 8, as illustrated as its enlarged representation in FIG. 2 comprises a fitting member 10 for the microscope proper axially supported at the lower end of the tube support member 9, a tube 11 attached to the fitting member 10 which takes a vertical position when the optical axis C is in steady state, and an eyepiece tube 13 attached to the tube 11 at its upper end, rotatable in a vertical direction of the tube 11 later described with a rotary support arm 12.

In the microscope proper 8 there is set a dial-type vertical adjustment knob 14 on the side wall of the microscope proper fitting member 10. By rotating this knob 14, the microscope proper 8 can be rotated with respect to the tube support member 9, so that the tube 11 turns up or down at a given angle with respect to an operation objective.

Furthermore, within the fitting member 10 there is disposed an angle detection means 15, such as a potentiometer, coaxially with the turning up and down knob (i.e., vertical adjustment knob) corresponding to a rotation angle of this adjustment knob 14, i.e., a turning up and down angle of the tube 11, an angle detection signal is sent out.

In the region of the side face of tube 11 to the side face of the rotary support arm 12 there is disposed an eyepiece tube drive means 16.

This eyepiece tube drive 16 comprises a motor 18 mounted on a fixture 17 attached to the tube 11, a driving gear 19 inserted on a driving shaft of the motor 18, a reduction gear 20 engaging with the driving gear 19 and a driven gear 21 attached coaxially with the rotary support arm 12, engaging with the reduction gear 20. This group of gears constitutes a power transmission mechanism.

Figure 2:
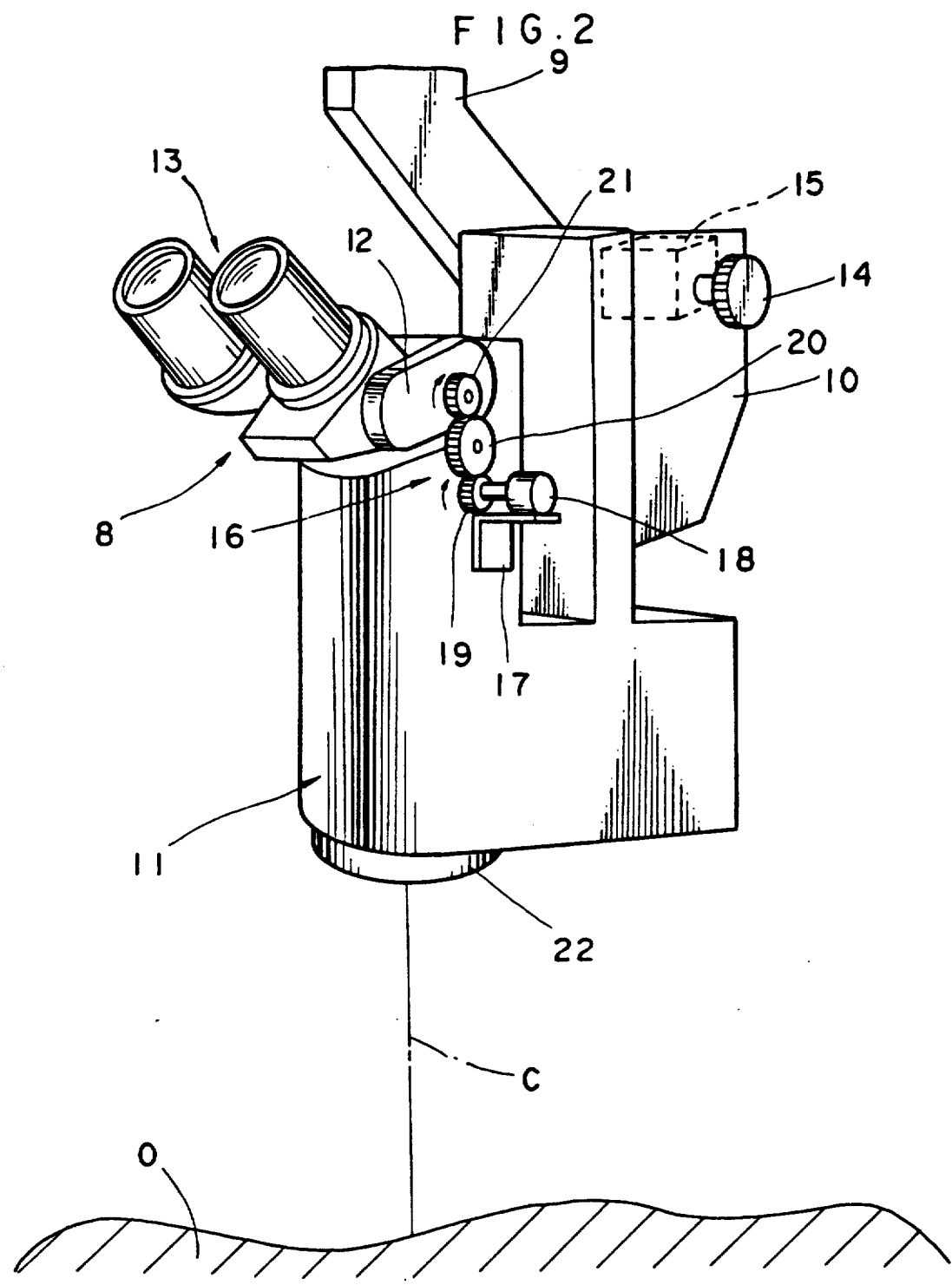
FIG. 2 is an enlarged perspective view of the microscope proper.

In FIG. 2, 22 is an objective lens tube.

Figure 3:
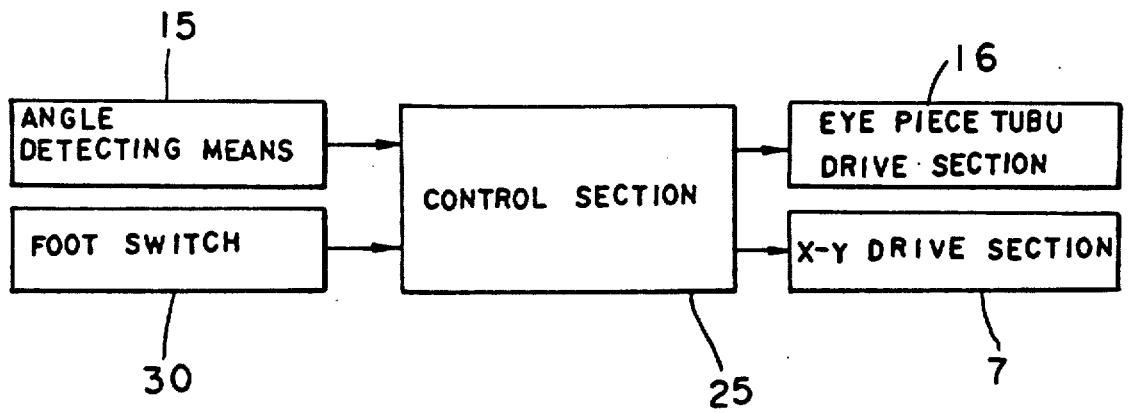
FIG. 3 is a block diagram of a control system thereof.

Next, with reference to FIG. 3, a control system of the aforementioned angle detection means 15 and the eyepiece tube drive section 16 will be explained.

The control system has a control section 25 including a CPU. The control section 25, which takes in angle information from the angle detection means 15, drive controls the eyepiece tube drive section 16 so that the eyepiece tube returns to its original position, corresponding to the angle information.

The control section 25 obviously controls the X-Y drive section 7 and also a zoom system and an illumination system, not shown, within the microscope proper 8 according to operation signals from the foot switch 30.

Figure 6:
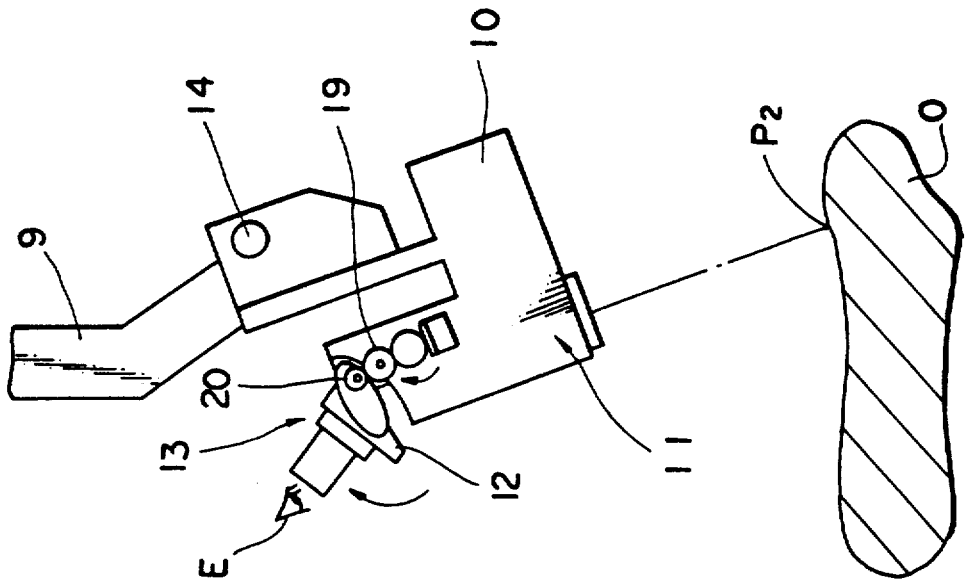

Operation of the operation microscope 1 of the above described construction will be explained with main emphasis on the turning up and down of the microscope proper 8, with reference to FIGS. 4-6.

Figure 4:
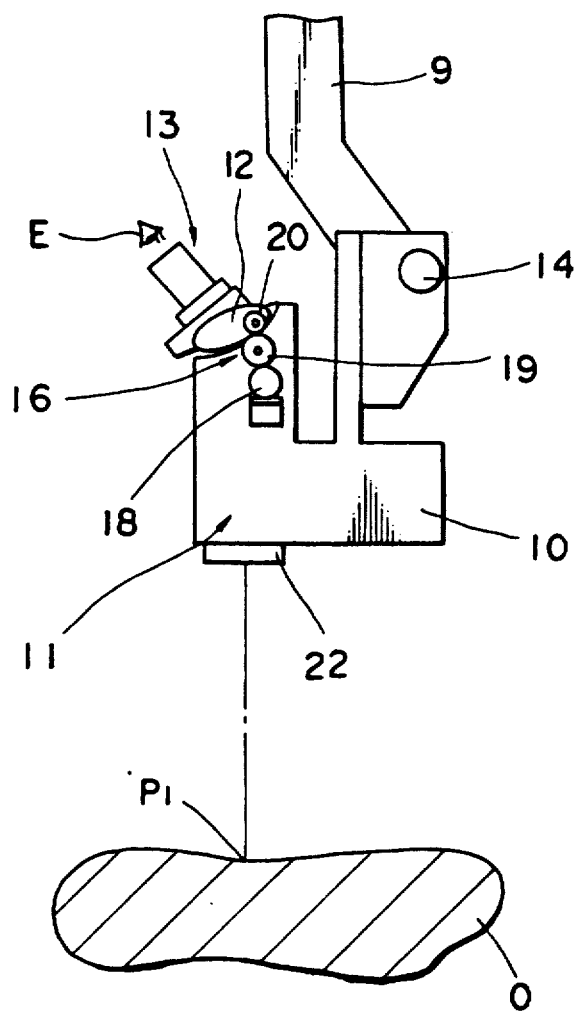
FIG. 4–6 are views illustrating turning up and down of the microscope proper.
Figure 5:
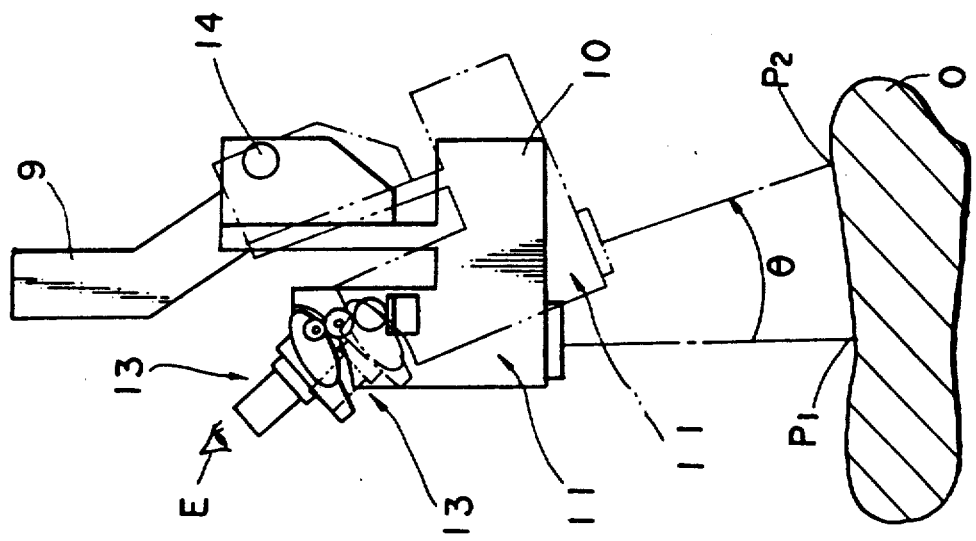

As the initial state, illustrated in FIG. 4, as tube 11 and an optical axis C of the microscope proper 8 are in vertical position, when the region $P_1$ of an operation objective 0 is being observed.

It is now supposed that, to observe the region $P_2$ of an operation objective 0, the operator rotates the adjusting knob 14 such that the tube 11 turns up by an angle $\theta$. By this handling, the tube 11 and the eyepiece tube 13 assume the positions shown by the two-dot chain lines in FIG. 5. In this state, the eyepiece tube 13 is away from the eye E of the operation person. However, angle information showing the turning up angle $\theta$ is sent out in this state from the angle detection means 15. The control section 25, which takes in this angle information, sends a drive signal corresponding to the turning up angle $\theta$ to a motor 18 constituting the eyepiece tube drive means. Accordingly, the motor 18 rotates a driving gear 19 in the arrow direction in FIGS. 2 and 6, and this rotation is transmitted to a driven gear 21 through a reduction gear 20. The rotary support arm 12 and the eyepiece tube 13 thus also rotate in the arrow directions in FIG. 6, so that the latter approaches the eye E of the operator (i.e., returns to its original position). Consequently, the operator can observe the region $P_2$ without adjusting the eyepiece tube 13, and without even shifting the position of the operator's eye.

With the present invention, in addition to the above described embodiment, various modifications are possible.

Figure 7:
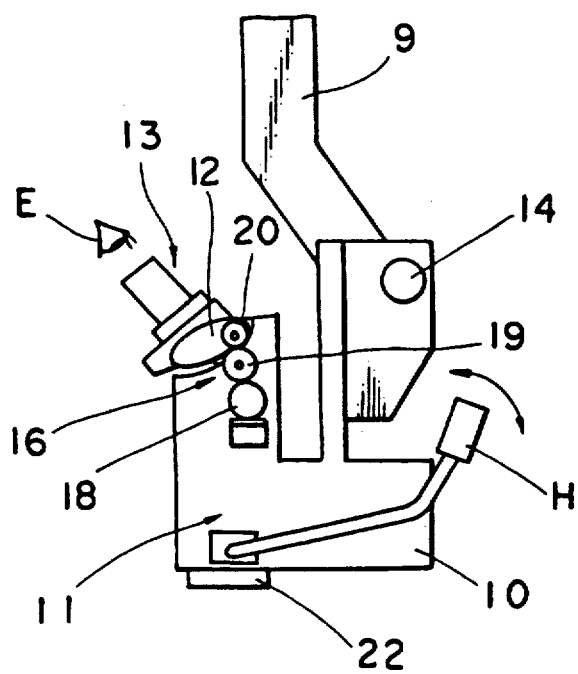
FIG. 7 and FIG. 8 are an elevation and a perspective view, respectively, of modified embodiments of the invention.

For instance, while in the described embodiment, the turning up and down of a tube 11 is done by means of a dial-type knob, as illustrated in FIG. 7, the handling may be done with an arm-type handle H attached at the lower end of the tube 11. The handle H is capable of changing position with little force, so that the adjustment becomes more convenient.

Figure 8:
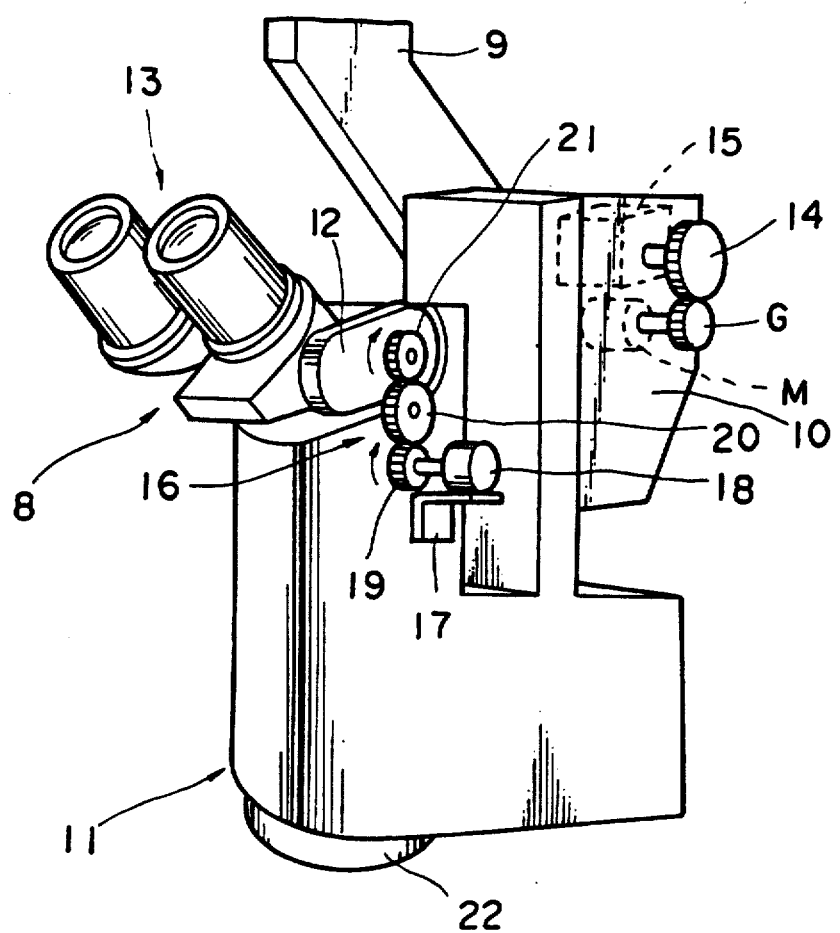

Further, the described turning up and down is not limited to manual handling. That is, as illustrated in FIG. 8, changing the position may be done electrically. There is disposed a motor M in which a gear G is connected to a dial-type knob 14. By means of the foot switch 30, the motor M is thus driven.

The above-described embodiments have been explained in terms of an operation microscope having only one eyepiece tube. The present invention, however, is also applicable to an operation microscope of the opposite-tube type having two eyepiece tubes.

What is claimed is:

1. An operation microscope comprising:
   a support;
   a tube attached to said support so as to be moved with respect to an operation objective;
   an eyepiece tube attached to the tube so as to change position in a direction of adjustment;
   an angle detecting means for detecting an original position and movement of the tube;
   an eyepiece tube drive means for changing a rotary angle of the eyepiece tube; and
   a control means for receiving detected results from said angle detection means and for controlling the eyepiece tube drive means based on said detected results to return said eyepiece tube to said original position.

2. An operation microscope as claimed in claim 1, wherein said eyepiece tube drive means includes a motor driven with a signal from the control means and a power transmission mechanism transmitting rotation of the motor to a rotary shaft of the eyepiece tube.

3. An operation microscope as claimed in claim 1 or 2 wherein said angle detection means is a potentiometer attached to a rotary shaft of the tube.

4. An operation microscope as claimed in claim 1, wherein adjusting the movement for said tube is done electrically.

* * * * *